(12) United States Patent
Schreiber et al.

(10) Patent No.: US 10,683,922 B2
(45) Date of Patent: Jun. 16, 2020

(54) GEARING

(71) Applicant: WITTENSTEIN SE, Igersheim (DE)

(72) Inventors: Heiko Schreiber, Gnaschwitz (DE); Michael Schmidt, Reichenberg (DE)

(73) Assignee: Wittenstein SE, Igersheim (DE)

( * ) Notice: Subject to any disclaimer, the term of this patent is extended or adjusted under 35 U.S.C. 154(b) by 0 days.

(21) Appl. No.: 15/093,117

(22) Filed: Apr. 7, 2016

(65) Prior Publication Data

US 2016/0298747 A1 Oct. 13, 2016

(30) Foreign Application Priority Data

Apr. 10, 2015 (DE) .................. 10 2015 105 524

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC .............. F16H 49/001; F16H 2049/003
See application file for complete search history.

(56) References Cited

U.S. PATENT DOCUMENTS

| | | | | |
|---|---|---|---|---|
| 1,141,098 A * | 6/1915 | Alquist | .................. | F16H 55/16 74/461 |
| 1,744,576 A * | 1/1930 | Rhett | ...................... | F16H 55/16 74/461 |
| 2,906,143 A * | 9/1959 | Walton | .................. | F16H 49/001 285/276 |
| 3,415,143 A * | 12/1968 | Ishikawa | .............. | F16H 49/001 74/640 |
| 4,798,104 A * | 1/1989 | Chen | ....................... | F16H 25/06 475/159 |
| 5,596,905 A * | 1/1997 | Kurosawa | ............... | F16H 55/14 74/443 |
| 6,025,062 A * | 2/2000 | Krenkel | ................. | B29C 70/10 305/194 |

(Continued)

FOREIGN PATENT DOCUMENTS

| | | |
|---|---|---|
| CN | 101627228 A | 1/2010 |
| CN | 101652582 A | 2/2010 |

(Continued)

OTHER PUBLICATIONS

Chinese office action for patent application No. 201610217753.7 dated Aug. 30, 2019.

*Primary Examiner* — Zakaria Elahmadi
(74) *Attorney, Agent, or Firm* — Bachman & LaPointe, PC

(57) ABSTRACT

Gearing (1), comprising a toothing (5), a tooth carrier (11) with radially oriented guides with in each case one tooth root opening and one tooth tip opening, teeth (7) which are received in the guides for engagement with the toothing (5), wherein the teeth (7) are mounted in the guides so as to be displaceable in the direction of their longitudinal axis and radially relative to the tooth carrier (11), wherein a central section of the guides, respectively, has an internal profile which is uniform in the longitudinal direction of the guide, a cam disk (20) for the radial drive of the teeth (7), wherein the teeth (7) have a run-in region between a respective tooth tip and a respective tooth body.

9 Claims, 2 Drawing Sheets

(56) References Cited

U.S. PATENT DOCUMENTS

| | | | |
|---|---|---|---|
| 6,142,033 A * | 11/2000 | Beigang | F16D 1/06 74/457 |
| 7,303,499 B2 | 12/2007 | Klindworth | |
| 7,316,211 B2 | 1/2008 | Klindworth | |
| 8,256,327 B2 | 9/2012 | Schreiber | |
| 8,307,738 B2 * | 11/2012 | Schmidt | F16H 25/06 74/640 |
| 8,480,528 B2 * | 7/2013 | Wilhelm | F16H 25/06 475/162 |
| 8,881,615 B2 * | 11/2014 | Schreiber | F16H 19/04 74/424.94 |
| 9,234,572 B2 * | 1/2016 | Klinger | F16H 55/16 |
| 2002/0134184 A1 * | 9/2002 | Hawkins | F16H 55/08 74/457 |
| 2005/0132836 A1 * | 6/2005 | Colbourne | F16H 55/08 74/457 |
| 2005/0268872 A1 | 12/2005 | Klindworth | |
| 2005/0280303 A1 * | 12/2005 | Klindworth | B60N 2/2252 297/373 |
| 2007/0065666 A1 | 3/2007 | Keller et al. | |
| 2007/0180943 A1 * | 8/2007 | Daout | F16H 55/16 74/457 |
| 2009/0205451 A1 * | 8/2009 | Bayer | F16H 25/06 74/325 |
| 2009/0260470 A1 * | 10/2009 | Bannier | F16H 55/18 74/461 |
| 2010/0077882 A1 * | 4/2010 | Schreiber | F16H 25/06 74/461 |

FOREIGN PATENT DOCUMENTS

| | | | |
|---|---|---|---|
| DE | 10215881 A1 | | 10/2003 |
| DE | 10247204 A1 | | 4/2004 |
| DE | 10351258 A1 | | 6/2005 |
| DE | 102007011175 A1 | | 9/2008 |
| DE | 102007016189 A1 | | 10/2008 |
| DE | 102013110019 A1 * | 3/2015 | F16H 25/06 |
| DE | 102013110019 A1 | | 3/2015 |
| EP | 0201730 A1 | | 11/1986 |
| JP | 6293446 U | | 6/1987 |
| JP | 2010523906 A | | 7/2010 |

* cited by examiner

GEARING

BACKGROUND OF THE INVENTION

The invention relates to a gearing and to the use of a gearing and to a tooth for a gearing.

From the prior art, gearings are known which comprise teeth which are mounted in radially displaceable fashion in a tooth carrier. Drive input elements with a profiling, such as for example cam disks, are used for driving the teeth. The teeth engage into a toothing such that a relative movement between the tooth carrier with the teeth and the toothing occurs. The relative movement between toothing and teeth is in this case smaller, by at least an order of magnitude, than the movement of the drive input element with the profiling. In this way, it is possible to realize high transmission ratios; an example of a gearing of said type is published in DE 10 2007 011 175 A1.

A critical point of said gearing is the mounting of the teeth in the tooth carrier. The transmission of forces from the tooth to the tooth carrier, which may typically constitute the drive output, gives rise to generation of heat and, under some circumstances, to material abrasion as a result of the movement of the teeth. Both may be undesirable during operation.

It is an object of the invention to specify a gearing or a tooth which are improved in relation to gearings known from the prior art, wherein it is sought to achieve reduced generation of heat or reduced wear. It is also an object of the invention to specify the use of a gearing of said type.

SUMMARY OF THE INVENTION

The object is achieved by way of a gearing according to the present invention. Advantageous refinements and embodiments will emerge from the hereinbelow description.

One aspect of the invention relates to a gearing, in particular a coaxial gearing or linear gearing, having a toothing, having a tooth carrier with radially oriented guides with in each case one tooth root opening and one tooth tip opening, teeth which are received in the guides for engagement with the toothing, wherein the teeth are mounted in the guides so as to be displaceable in the direction of their longitudinal axis and radially relative to the tooth carrier, a cam disk for the radial drive of the teeth, wherein the teeth have a run-in region, in particular with a cone, between a respective tooth tip and a respective tooth body.

A further aspect of the invention relates to the use of a gearing in one of the typical embodiments described here.

A further aspect of the invention relates to a tooth for a gearing in one of the typical embodiments described here, wherein the tooth has a run-in region, in particular with a cone, between a tooth tip and a tooth body.

Embodiments of the invention relate in particular to coaxial gearings. Gearings of the invention typically comprise an internally situated cam disk with a profiling as drive input element, and an internal gear with an internal toothing, or an external drive input element with an internal profiling and an internally situated gearwheel or an internally situated toothed rack which, in the case of the externally situated drive input element, constitutes the toothing. Configurations of embodiments relate to linear gearings for the conversion of a rotation into a linear movement.

The toothing is typically an encircling toothing. The toothing is engaged into by the teeth or the tooth tips of the teeth, wherein the teeth are typically mounted so as to be linearly radially displaceable relative to the tooth carrier. Here, "linearly radially" means, in the conventional sense, that a guide in a radial direction is provided, which guide permits only a movement of the tooth in the radial direction. Typically, by way of the guide, the tooth segment can be displaced linearly in precisely one direction; this may be achieved for example by virtue of the fact that the tooth has a uniform cross section of a particular length in the displacement direction, wherein the tooth carrier likewise has an opening for the tooth segment with a uniform cross section. The teeth are normally mounted in the tooth carrier so as to be displaceable in each case in precisely one direction, typically in the direction of the longitudinal axis of the tooth. Furthermore, in typical embodiments, the rotational degree of freedom of the teeth relative to the tooth carrier about the longitudinal axis of the gearing is blocked. This may be achieved for example by way of a linear guide of the teeth in a radial direction in the tooth carrier. In this way, the teeth rotate with the tooth carrier about the longitudinal axis of the gearing, but not relative to the tooth carrier.

In typical embodiments of the gearing according to the invention, at least a part of the teeth is of flexurally rigid design. Here, the expression "flexurally rigid" is typically to be understood in the technical sense, that is to say bending of the teeth is, owing to the rigidity of the material of the teeth, so slight as to be at least substantially insignificant with regard to the kinematics of the gearing. Flexurally rigid teeth comprise, in particular, teeth which are produced from a metal alloy, in particular steel or a titanium alloy, a nickel alloy or other alloys. Furthermore, it is also possible for flexurally rigid teeth composed of plastic to be provided, in particular in the case of gearings in which at least one of the following parts is likewise produced from plastic: a toothing on an internal gear or on a gearwheel, tooth carrier and drive input element. In typical embodiments of the invention, the tooth carrier and the teeth are produced from a metal alloy, or additionally the toothing, or further additionally the drive input element, are produced from a metal alloy. Such gearings have the advantage of being extremely resistant to torsion and having an extremely high load capacity. Gearings composed of plastic have the advantage of having a low weight. The expression "flexurally rigid" refers in particular to flexural rigidity about a transverse axis of the tooth segment. This means in particular that, considering the tooth segment as a beam from a tooth root to a tooth tip, flexural rigidity exists which at least substantially prevents bending deformations between tooth tip and tooth root. Owing to the flexural rigidity, an extremely high load capacity and resistance to torsion of the gearing is achieved.

In typical embodiments, there is arranged between the tooth and the profiling a pivot segment, which is mounted on a rolling bearing arrangement which in turn lies against the profiling. Advantageous embodiments comprise a pivot segment which is arranged between the drive input element with the profiling and in each case at least one tooth. The pivot segment allows the tooth to tilt relative to the profiling or relative to the pivot segment. It is typical for at least two teeth to be mounted on a pivot segment. Multiple teeth mounted on one pivot segment are typically arranged adjacent to one another in a row in an axial direction.

Typically, the tooth segment is loosely connected to the pivot segment. Here, a "loose connection" preferably means that the tooth segment is merely placed onto the pivot segment, normally placed thereon directly. Preferred pivot segments comprise a profile which prevents the tooth from slipping off the pivot segment, or prevents slippage of the pivot segment at least in one direction. It should be taken into consideration that the pivot segments are, in this way, held in their position in the rotational direction relative to the tooth carrier by the radially and linearly guided teeth. Such a profile may for example be a bead which engages into a depression. It is ensured in this way that the tooth segment does not slide over the pivot segment. It is achieved in this way that the pivot segment is fixed on the position of the tooth and a relative movement in a circumferential direction between tooth segment and pivot segment is prevented. Here, the profile is preferably arranged such that displaceability in a circumferential direction is blocked, such that slipping-off in a circumferential direction is prevented. In further embodiments, it is however also possible for spherical-cap-shaped, spherical or other elevations to be provided which prevent slippage of the pivot segments relative to the teeth.

Typical pivot segments make it possible to realize a segmented bearing arrangement. In typical embodiments, the pivot segments or other bearing segments, such as plates, form a segmented bearing arrangement. The segmented bearing arrangement offers the advantage that it can adapt to the profiling of the drive input element and, furthermore, permits reliable force transmission in a radial direction.

The pivot segments preferably have edges, facing toward one another, with elevations and depressions, for example an undulating form or a serrated form. This offers the advantage that needle rollers which are arranged under the pivot segments are reliably held in the space between the pivot segments and the drive input element even in the case of a relatively large spacing between the pivot segments.

The loose connection between the tooth segment and the pivot segment offers the advantage of simple construction. Here, a "loose connection" means in particular that the teeth are not prevented from lifting off from the pivot segments. A lift-off of the teeth from the pivot segments is, in the case of generic gearings, generally prevented by virtue of the fact that the teeth are guided at the tooth tips by the toothing.

Typical embodiments of the invention comprise a drive input element with a profiling. The profiling preferably has a non-circular or non-ellipsoidal arcuate shape or curve. The non-circular or non-ellipsoidal arcuate shape offers the advantage that any desired profilings can be used, for example in order to set different transmission ratios. In the context of this application, eccentrics likewise fall under the definition of circular or ellipsoidal shapes, because in the case of eccentrics, it is merely the case that the axis of rotation does not correspond to the central axis of the circular shape, despite a circular shape nevertheless being present. In typical embodiments, the tooth carrier or the toothing is of circular form. This offers the advantage of a simple geometry for the tooth carrier and for the toothing. It is typically the case that the transmission of force on the slow side of the gearing takes place between the toothing and the tooth carrier. This offers the advantage that the travel for the force transmission is extremely short, such that extremely high rigidity can be achieved. Embodiments which satisfy said conditions include, but are not limited to: a gearing with internally situated cam disk as drive input and externally situated internal gear with toothing, wherein the tooth carrier is arranged between internal gear and cam disk; an externally situated cam disk with internally situated profiling on an internal gear for the drive of the radially movable teeth inward against a toothing, which is arranged on a toothed wheel or a toothed rack.

The toothing and the teeth typically have curved flanks. Examples of curvatures of the flanks are a cylindrical curvature or a curvature in the form of a logarithmic spiral. For a possible embodiment of a curvature in the form of a logarithmic spiral, reference is made to DE 10 2007 011 175 A1. The curved surface offers the advantage that the flanks that are in engagement make areal contact and not merely linear or punctiform contact. In this way, extremely high rigidity is realized in the transmission of force between the toothing and the teeth.

In typical embodiments, the cam disk for the radial drive of the radially displaceably mounted teeth comprises two encircling rims, between which a raceway is arranged. In this way, the rolling bodies arranged between the rims are guided in secure fashion. Typical embodiments comprise a multiplicity of pivot segments which are arranged or mounted in encircling fashion on the rolling bearing bodies and which lie in each case by way of a rolling bearing surface against the rolling bodies, wherein, on both sides of the rolling bearing surface, there is arranged in each case one rim bearing surface, wherein the two rim bearing surfaces of in each case one pivot segment lie at least partially against the rims. In this way, reliable guidance of the pivot segments is realized. The rim bearing surfaces and rolling bearing surfaces are typically arranged adjacent to one another on the same side of a pivot segment, normally on that side which is situated opposite a tooth bearing side, that is to say the side on which the teeth are mounted.

Typical tooth carriers comprise radially oriented guides with in each case one tooth root opening and one tooth tip opening. The tooth root opening is typically oriented in the direction of the cam disk, and the tooth tip opening is typically oriented in the direction of the toothing. This allows the teeth to be received such that they are mounted so as to be displaceable along their longitudinal axis in the radial direction of the gearing. The longitudinal axis of the teeth typically runs from a tooth root of a tooth to the tooth tip of a tooth. The teeth are each mounted, by way of their tooth roots, on pivot segments, which in turn are mounted on the cam disk by way of rolling bodies. In typical embodiments, the tooth carrier is of circular or ring-shaped form. Typical guides for the teeth in the tooth carrier are in the form of passage openings or passage bores. Further typical tooth carriers comprise rectangular milled portions or slots as guides. The teeth are typically received in the tooth carrier such that the tooth tip protrudes, or can be displaced, out of the tooth tip opening and the tooth root protrudes out of the tooth root opening. By virtue of the cam disk being driven by way of the rolling bodies and the pivot segments, a force can be exerted on the teeth in a radial direction, such that said teeth are pushed out of the guides on the tooth tip side.

Typical tooth root openings each have a bevel. The bevel is typically provided at the entrance of the tooth root opening at the inner side of the guide. Typically, the inner profile or cross-sectional profile of the guide is uniform or constant at least in sections in a region between the tooth tip opening and the tooth root opening. Typical bevels at the tooth root opening may, in the case of circular openings, be of conical form. Typical angles of the bevel at the tooth root opening are at least 1° or at least 3° or at least 5° or at most 55° or at most 45° or at most 35° in relation to a longitudinal direction or guide direction of the guide.

In typical embodiments, a transition between the bevel of the tooth root opening and a central section of the guide is of domed form. The central section typically has an internal profile which is uniform in the longitudinal direction of the guide, or a uniform cross section. Typically, the uniform internal profile or the uniform cross section extends as far as the tooth tip opening.

Typically, the length of central section of the guide is at least 50% or at least 75% of the whole length of the guide.

The length of the guide typically corresponds to the thickness of the ring of the tooth carrier. In typical embodiments, the teeth have a constant section with a uniform cross section. Typically, the uniform cross section corresponds at least substantially with the internal profile in the central section of the guide. Typically, the constant section of the teeth is running over at least 40% or at least 60% of the total length of the teeth in their lingotudinal direction. With the named features, a reliable guidance of the teeth in the guides is achieved.

Typically, the teeth have a run-in region between a respective tooth tip and a respective tooth body. Typical run-in regions comprise a cone of the tooth between the respective tooth tip and the tooth body. In the case of the run-in region, the expression "cone" also encompasses bevels formed on flat teeth. Typical run-in regions may be planar and have a bevel. Typical embodiments comprise flat teeth which are guided in guides with polygonal cross section in the tooth carrier. In typical embodiments, two or more flat teeth are arranged adjacent to one another, or the tooth has a width in the axial direction of the gearing which is at least twice as great as the thickness of said tooth in the direction of rotation of the gearing. Further embodiments comprise rounded or circular teeth or circular teeth with flat portions. "Tooth body" typically refers to that section of the tooth which, aside from lubricating ducts or the like, has a uniform cross section.

Typically, a transition in each case between the cone of the tooth and the tooth body is of domed form. This allows the tooth to slide along in the guide in a gentle manner. Typically, the teeth are received in the respective guides of the tooth carrier such that, at a maximum radial stroke of the teeth in the direction of the toothing, the run-in region of the tooth or of the cone of the tooth remains at least partially within the guide. In further embodiments, at a maximum radial stroke, the cone protrudes out of the guide. Typical angles of the cone of the tooth are at least 0.05° or at least 0.1° or at least 0.2° or at most 10° or at most 5° or at most 3°.

Typical teeth of embodiments each at least partially have a different surface hardness than the guides of the tooth carrier. Typically, the teeth have a different surface hardness than the tooth carrier. For example, in embodiments, the surfaces of the teeth are in each case harder, or have a greater hardness, than the surface of the guides in the tooth carrier. Typically, the teeth are at least partially coated and/or surface-hardened. It is thus possible, for example, for the lateral outer surfaces of the teeth, or for the teeth as a whole, to be coated or surface-hardened. In typical embodiments, the tooth carrier is not coated, is not surface-hardened, or is coated differently than the teeth. In typical embodiments, the teeth are composed of a different material, for example a different alloy, or are hardened in a different production process, in relation to the tooth carrier.

In one embodiment, a coating of the teeth may comprise: an amorphous carbon layer, for example a DLC (diamond-like carbon) layer, a chromium layer, layers deposited by PVD coating, crystalline carbon layers and/or diamond coatings. In embodiments of the invention, the amorphous carbon layer may comprise a-C, ta-C, a-C:Me, a-c:H, ta-C:H, a-C:H:Me and/or a-C:H:X, wherein Me represents metallic doping elements and X represents non-metallic doping elements. In some embodiments, which may be combined with other embodiments, the layer applied by way of PVD coating may comprise TiN, CrN, TiAlN, TiCN, TiSiN, ZrN and/or AlTiN.

Typical embodiments of teeth comprise in each case one lubrication groove in the region of the respective tooth bodies of the teeth. The lubrication groove may be of encircling form or may be of interrupted form. Typically, said lubrication groove is of encircling form in a plane perpendicular to a longitudinal axis of the tooth. Lubrication grooves can improve the distribution of a lubricant. Further embodiments comprise no lubrication groove on the tooth, or comprise a lubrication groove in the guide in the tooth carrier.

BRIEF DESCRIPTION OF THE DRAWINGS

Below, the invention will be discussed in more detail on the basis of the appended drawings, wherein, in the Figures.

DETAILED DESCRIPTION

Below, typical embodiments of the invention will be described on the basis of the Figures, wherein the invention is not restricted to the exemplary embodiments; the scope of the invention is rather defined by the claims. In the description of the embodiment, in some cases, the same reference designations have been used for identical or similar parts in different Figures and for different embodiments in order to make the description clearer. This however does not mean that corresponding parts of the invention are restricted to the variants illustrated in the embodiments.

Figure 1:
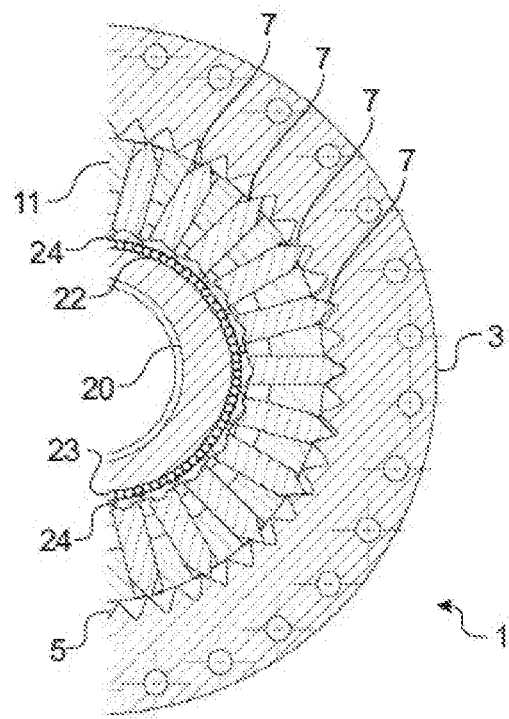
FIG. 1 schematically shows a first embodiment of the invention in a halved schematic sectional view.

FIG. 1 shows an exemplary embodiment in a schematic halved sectional view. FIG. 1 schematically shows, in a halved section, a gearing 1 which has an internal gear 3 with an internally situated encircling toothing 5. A second half of the gearing 1 is, in section, of analogous construction to the section illustrated. Teeth 7 engage into the toothing 5. For better clarity, not every tooth segment 7 in FIG. 1 is denoted by the reference designation 7. The teeth 7 are mounted in radially displaceable fashion in a tooth carrier 11. For this purpose, the tooth carrier 11 has radially oriented, duct-like circular or slot-shaped openings which ensure radial guidance of the teeth 7 in the tooth carrier 11. Owing to the radial guidance in the openings, the teeth 7 are capable of moving only in a radial direction along their longitudinal axis; in particular, a rotation relative to the tooth carrier about a longitudinal axis of the gearing 1 is prevented.

The longitudinal axis of the teeth typically refers to the axis running from the tooth root to the tooth tip, whereas the longitudinal axis of the gearing points in the direction of the axis of rotation of the gearing. This may for example be the axis of rotation of the tooth carrier that can be used as drive output, or else the axis of rotation of a cam disk.

The teeth 7 are driven by a drive input element (see FIG. 3) which comprises a hollow cam disk 20. The cam disk 20 has a profiling 22 for driving the teeth 7 in the radial direction. A course of the profiling 22 has two elevations over the circumference, such that respectively oppositely situated teeth 7 are engaged into tooth spaces of the toothing 5 to the furthest extent. In further embodiments, the cam disk has three elevations, and in yet further embodiments, the cam disk has only one elevation, or in further embodiments, the cam disk has more than three elevations.

In the gearing 1 illustrated in FIG. 1, the teeth 7 are arranged, with a rolling bearing, on the profiling of the drive input element. The rolling bearing comprises rolling bodies 23 which, in this exemplary embodiment, are in the form of needle rollers.

In the exemplary embodiment of FIG. 1, the cam disk is arranged at the inside, and the toothing is arranged at the outside. In such a configuration, the drive output action is picked off at the internal gear with the toothing or at the tooth carrier, wherein the respective other element is fixed. In further embodiments, the drive input element is arranged at the outside, that is to say outside the tooth carrier, and the toothing is arranged at the inside. It is in turn possible for the drive output action to be picked off at the inner toothing or at the tooth carrier. The tooth carrier may also be referred to, with its openings, as tooth cage, in which teeth are received so as to be guided in radially linearly displaceable fashion.

The gearing 1 comprises a segmented bearing arrangement for the teeth 7. The segmented bearing arrangement comprises pivot segments 24 which each have, on the side facing toward the tooth 7, a rounded tooth bearing surface (see FIG. 2) which forms a bead on which the root of a tooth 7 or, in typical embodiments, 2, 3 or 4 teeth adjacent to one another in an axial direction of the gearing 1, may be arranged. The bead, together with a corresponding recess in the tooth root of the respective tooth 7, prevents slippage of the tooth 7 on the pivot segment 24.

The beads serve in each case to form root joints for the teeth 7, such that the teeth 7 can tilt relative to the pivot segments 24 in order to ensure unconstrained guidance. The pivot segments 24 are displaceable relative to one another in a direction of rotation, such that the spacings between the pivot segments 24 can be varied. In this way, the degree of freedom in the direction of rotation of the pivot segments 24 is also not blocked. This permits substantially unconstrained guidance and substantially unconstrained radial drive of the pivot segments 24 by the profiling 22 of the cam disk 20. To minimize the friction resistance between the profiling 22 and the pivot segments 24, the rolling bodies 23 are provided as needle rollers. In further embodiments, balls or other rolling bearings are provided for the mounting of pivot segments.

FIGS. 1 to 5 will be described together, wherein not all of the details will be discussed again, and reference designations are used identically for the same parts.

Figure 2:
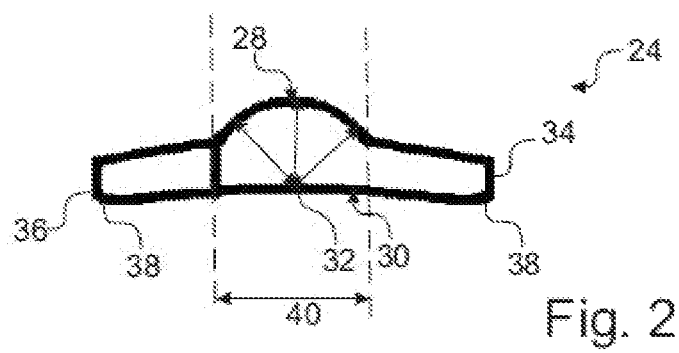
FIG. 2 shows a detail of the embodiment of FIG. 1 in a schematic sectional view.

FIG. 2 illustrates a pivot segment 24 of the gearing 1 of FIG. 1. The pivot segment 24 comprises a tooth bearing on that side of the pivot segment 24 which, in the gearing 1, faces toward a tooth 7. The tooth bearing of the pivot segment 24 comprises a tooth bearing surface 28 which comprises a rounded surface section for in each case at least one tooth 7. The rounded surface section of the tooth bearing surface 28 is in this case of circular form. The central point of the circle coincides with a rolling bearing surface 30 of the pivot segment 24. In this way, for the teeth 7 which are mounted on the pivot segments 24, a respective axis of rotation 32 is realized which coincides with the rolling bearing surface 30. The rolling bearing surface 30 is in this case that side of the pivot segment 24 which is averted from the tooth, that is to say the side which faces toward the rolling body 23 or toward the cam disk 20. The rolling bearing surface 30 corresponds to the surface on which the rolling bodies 23 roll.

The pivot segment 24 comprises a segment edge 34 which is at the front in the direction of rotation and a segment edge 36 which is at the rear in the direction of rotation. Here, the expressions "front" and "rear" are not meant in the sense of a movement; rather, they refer to two opposite sides of the pivot segment 24. Typical gearings can be operated in two directions, such that, during operation, it is also possible for the front segment edge to be situated at the rear in the direction of movement during rotation, and accordingly for the rear segment edge to be situated at the front.

Rounded set-back portions or bevels 38 are provided in each case at the transition from the rolling bearing surface 30 to the front segment edge 34 and to the rear segment edge 36. Said set-back portions or bevels facilitate a run-in of the rolling bodies 23 and can thus increase the running smoothness of the respective pivot segments 24.

In further embodiments, in the region of the segment edges, rounded transitions are provided between the rolling bearing surface and the side surface of the segment edge. Said rounded transitions may also be referred to as rounded set-back portions. Typically, bevels or rounded set-back portions are provided at least, or only, in the region of the projections.

In typical embodiments, the pivot segment is formed without an axial guide. Since the rims perform the guidance of the needle rollers, axial guidance on the pivot segment is not imperatively necessary. In typical embodiments, the projections are designed with point symmetry. Further embodiments are designed with axially symmetrically arranged projections.

The pivot segment 24 of FIG. 2 has a central strip 40 which is situated between two dashed lines in FIG. 2. Said central strip 40 is situated under the tooth bearing surface 28. In front of and behind the central strip 40 in the direction of rotation, there are situated respective projections which run parallel with steps or in a zigzag pattern and which thereby permit engagement of the rolling bearing surfaces into one another.

For the guidance of the teeth 7 in the tooth carrier 11, a certain amount of play is inevitably required. Thus, in the support of the tooth 7 in the tooth carrier 11 under load, there is "2-point contact", firstly in the region of a tooth root opening of the guide and secondly in a region of a tooth tip opening of the guide. Embodiments provide a special design of the tooth carrier 11 and/or of the tooth 7 at these locations.

Figure 3:
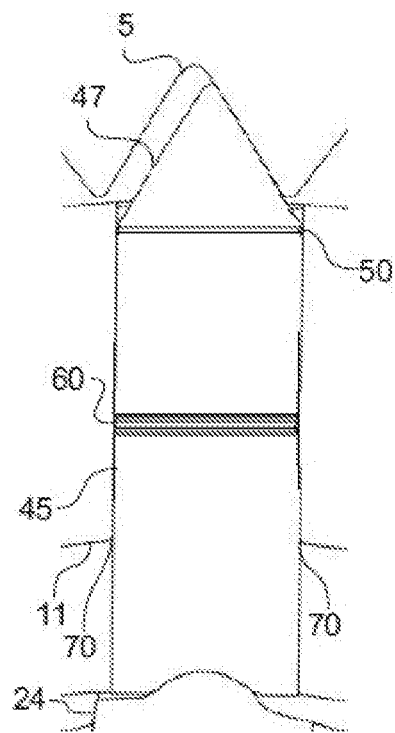
FIG. 3 shows a detail of the embodiment of FIG. 1 in a schematic sectional view.
Figure 4:
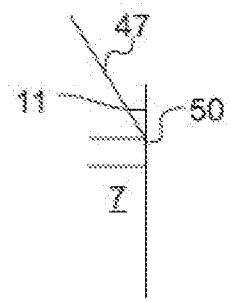
FIG. 4 shows a detail of FIG. 3 in a schematic sectional view.
Figure 5:
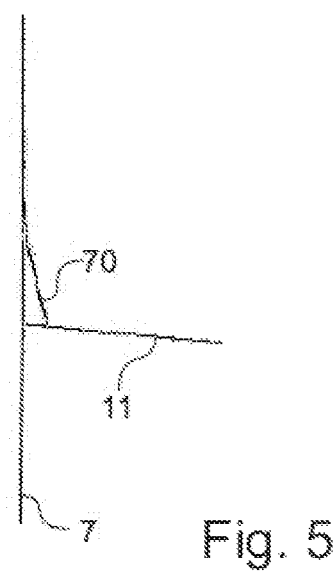
FIG. 5 shows a further detail of FIG. 3 in a schematic sectional view.

FIG. 3 illustrates a tooth 7 on an enlarged scale. The tooth 7 comprises a cone 50 at a transition from a tooth body 45 to a tooth tip 47. The cone 50 is part of a run-in region and has an angle of 1° in relation to a longitudinal axis of the tooth 7. The cone is illustrated once again on an enlarged scale in FIG. 4, which will be described together with FIG. 3. The transition between the cone 50 of the tooth 7 and the tooth body 45 is of domed form.

The measures, individually or in combination, reduce the wear in the contact region between the tooth 7 and the guide of the tooth carrier 11 in the region of the tooth tip opening of the guide. The tooth tip opening is that opening of the guide of the tooth carrier 11 which is illustrated at the top in FIG. 3. The tooth root opening of the guide is situated opposite the tooth tip opening and is illustrated at the bottom in FIG. 3.

The tooth root openings of the tooth carrier 11 each have a bevel 70. Said bevel 70 is shown once again on an enlarged scale in FIG. 5, which will be described together with FIG. 3. The bevel 70 has an angle of 15° with respect to the longitudinal axis of the tooth 7. Since the longitudinal axis of the tooth 7 also corresponds to the longitudinal axis of the guide of the tooth carrier 11, the bevel 70 thus has an angle of 15° with respect to a central section of the circular opening of the guide. The tooth 7 is likewise circular, but in embodiments, may also have flattened portions on the side flanks.

The transition between the bevel 70 of the tooth root opening and a central section of the guide is of domed form. This eliminates sharp edges or burrs.

The measures, individually or in combination, reduce the wear in the contact region between the tooth 7 and the guide of the tooth carrier 11. The measures are configured such that the regions of contact are situated as far as possible to the outside and as far as possible to the inside in the tooth carrier and bear load areally with elastic deformation, in order that the loads are minimized. The regions of contact, which are situated far apart from one another, yield a large lever arm. The domed transitions can improve the build-up of a lubricating film.

Furthermore, the tooth comprises a lubrication groove 60 arranged in encircling fashion centrally on the tooth body 45. The lubrication groove can improve a distribution of lubricant in the guide.

For further minimization of wear, it is provided, in embodiments, that the guide in the tooth carrier is harder than the tooth, or the tooth is harder than the tooth carrier. The respectively harder part may typically be formed with a particularly smooth surface, for example with a coating, in order to further reduce wear.

In the variant with a relatively hard tooth, the advantage may be attained that a wear-resistant surface coating with low friction coefficients in terms of solid state friction can be applied to the tooth in a relatively straightforward manner. Such a coating on the tooth then has an effect not only in the region of contact with the tooth carrier but in particular also in the region of contact with the toothing.

In the exemplary embodiment of FIGS. 1 to 5, the teeth 7 have a DLC (diamond-like carbon) coating.

The invention is not restricted to the embodiment described above; rather, the scope of the invention is defined by the appended claims.

The invention claimed is:

1. Gearing comprising:
    a toothing;
    a tooth carrier with radially oriented guides with in each case one tooth root opening and one tooth tip opening;
    teeth which are received in the guides for engagement with the toothing, wherein the teeth are mounted in the guides so as to be displaceable in the direction of their longitudinal axis and radially relative to the tooth carrier, but cannot rotate relative to the tooth carrier, wherein a central section of the guides, respectively, has an internal profile which is uniform in the longitudinal direction of the guide, and wherein the teeth have a constant section having a uniform cross section which corresponds at least substantially with the internal profile of the guide; and
    a cam disk for the radial drive of the teeth,
    wherein the teeth have a tooth tip with tooth flanks and wherein the teeth comprise a tooth body,
    wherein each of the teeth comprises a run-in region between its respective tooth flanks and its respective tooth body, and wherein the run-in region comprises a cone with an angle of the cone being at most 3° in relation to a longitudinal axis of the respective tooth.

2. Gearing according to claim 1, wherein a transition in each case between the cone of the tooth and the tooth body is of domed form.

3. Gearing according to claim 1, wherein the tooth root openings each have a bevel.

4. Gearing according to claim 3, wherein a transition between the bevel of the tooth root opening and a central section of the guide is of domed form.

5. Gearing according to claim 1, wherein each of the teeth at least partially have a different surface hardness than the guides of the tooth carrier.

6. Gearing according to claim 1, wherein the teeth are at least partially coated and/or surface-hardened.

7. Gearing according to claim 1, wherein a lubrication groove is provided in the region of the respective tooth bodies of the teeth.

8. Gearing according to claim 7, wherein the lubrication groove is of encircling form.

9. Gearing comprising:
    a toothing;
    a tooth carrier with radially oriented guides with in each case one tooth root opening and one tooth tip opening;
    teeth which are received in the guides for engagement with the toothing, wherein the teeth are mounted in the guides so as to be displaceable in the direction of their longitudinal axis and radially relative to the tooth carrier, but cannot rotate relative to the tooth carrier, wherein a central section of the guides, respectively, has an internal profile which is uniform in the longitudinal direction of the guide, and wherein the teeth have a constant section having a uniform cross section which corresponds at least substantially with the internal profile of the guide; and
    a cam disk for the radial drive of the teeth,
    wherein the teeth have a run-in region between a respective tooth tip and a respective tooth body, and
    wherein the run-in region comprises a cone with an angle of the cone being at most 3° in relation to a longitudinal axis of the respective tooth.

* * * * *